US011956245B1

(12) United States Patent
Bhatt et al.

(10) Patent No.: US 11,956,245 B1
(45) Date of Patent: Apr. 9, 2024

(54) INTELLIGENT DATA PROTECTION

(71) Applicant: Wells Fargo Bank, N.A., San Francisco, CA (US)

(72) Inventors: Kaushik Kishanlal Bhatt, Hyderabad (IN); Swapnil Sharma, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/068,292

(22) Filed: Dec. 19, 2022

Related U.S. Application Data

(63) Continuation of application No. 16/783,968, filed on Feb. 6, 2020.

(60) Provisional application No. 62/805,050, filed on Feb. 13, 2019.

(51) Int. Cl.
*H04L 29/00* (2006.01)
*G06F 21/62* (2013.01)
*G06N 5/04* (2023.01)
*G06N 20/00* (2019.01)
*H04L 9/40* (2022.01)

(52) U.S. Cl.
CPC ........ *H04L 63/102* (2013.01); *G06F 21/6245* (2013.01); *G06N 5/04* (2013.01); *G06N 20/00* (2019.01); *H04L 63/104* (2013.01); *H04L 63/105* (2013.01); *H04L 63/107* (2013.01)

(58) Field of Classification Search
CPC ... H04L 63/102; H04L 63/104; H04L 63/105; H04L 63/107; G06F 21/6245; G06N 5/04; G06N 20/00
See application file for complete search history.

(56) References Cited

U.S. PATENT DOCUMENTS

| | | | |
|---|---|---|---|
| 8,515,058 B1* | 8/2013 | Gentry | H04L 9/008 380/28 |
| 9,965,133 B1* | 5/2018 | Lindsey | G06F 21/53 |
| 10,454,950 B1* | 10/2019 | Aziz | H04L 63/1425 |
| 10,853,350 B1* | 12/2020 | Sharifi Mehr | G06F 16/2365 |
| 10,853,424 B1* | 12/2020 | Mandaviya | G06N 7/01 |
| 11,411,968 B1* | 8/2022 | Banerjee | H04L 63/1425 |
| 11,429,492 B2* | 8/2022 | Dethe | G06F 11/1464 |
| 2009/0150631 A1* | 6/2009 | Wilsey | G06F 21/85 711/163 |
| 2010/0158254 A1* | 6/2010 | Schaad | H04L 9/0891 380/282 |
| 2011/0314278 A1 | 12/2011 | Taskaya et al. | |
| 2014/0095868 A1* | 4/2014 | Korthny | G06F 21/64 713/165 |
| 2015/0310457 A1* | 10/2015 | Smith | G06Q 30/0201 705/7.29 |

(Continued)

*Primary Examiner* — Don G Zhao
(74) *Attorney, Agent, or Firm* — Kilpatrick Townsend & Stockton LLP

(57) ABSTRACT

A technological approach can be employed to protect data. Datasets from distinct computing environments of an organization can be scanned to identify data elements subject to protection, such as sensitive data. The identified elements can be automatically protected such as by masking, encryption, or tokenization. Data lineage including relationships amongst data and linkages between computing environments can be determined along with data access patterns to facilitate understanding of data. Further, personas and exceptions can be determined and employed as bases for access recommendations.

20 Claims, 13 Drawing Sheets

(56) References Cited

U.S. PATENT DOCUMENTS

| | | | |
|---|---|---|---|
| 2015/0324606 A1 | 11/2015 | Grondin et al. | |
| 2015/0326601 A1* | 11/2015 | Grondin | H04L 63/1433 |
| | | | 726/25 |
| 2015/0350902 A1* | 12/2015 | Baxley | H04W 4/90 |
| | | | 726/7 |
| 2017/0091680 A1* | 3/2017 | Rosenthal | G06Q 10/0633 |
| 2017/0171235 A1* | 6/2017 | Mulchandani | G06F 21/554 |
| 2017/0289168 A1* | 10/2017 | Bar | H04L 63/102 |
| 2018/0120783 A1* | 5/2018 | Billings | G05B 15/02 |
| 2018/0157703 A1* | 6/2018 | Wang | G06F 16/2453 |
| 2018/0191759 A1* | 7/2018 | Baijal | G06F 30/20 |
| 2018/0330108 A1 | 11/2018 | Gordon et al. | |
| 2019/0033799 A1* | 1/2019 | Billings | G06N 20/00 |
| 2019/0229914 A1* | 7/2019 | Patel | G06F 21/45 |
| 2019/0238644 A1* | 8/2019 | Chauhan | H04L 67/535 |
| 2019/0258953 A1* | 8/2019 | Lang | G06N 3/08 |
| 2020/0058063 A1* | 2/2020 | Holtzman | G06Q 30/0246 |
| 2020/0112755 A1* | 4/2020 | Seshadri | G06N 3/045 |
| 2020/0145720 A1* | 5/2020 | Krauss | H04N 21/812 |
| 2020/0167422 A1* | 5/2020 | Jayasingh | G06F 16/1748 |
| 2020/0233589 A1* | 7/2020 | Prahlad | G06F 3/0685 |
| 2020/0267045 A1* | 8/2020 | Defiebre | G06F 9/5077 |
| 2020/0311304 A1 | 10/2020 | Parthasarathy | |
| 2020/0314126 A1* | 10/2020 | Schmugar | H04W 12/12 |
| 2021/0241310 A1* | 8/2021 | Bettencourt-Silvia | |
| | | | G06N 20/00 |
| 2021/0243223 A1* | 8/2021 | Arora | H04L 63/1491 |
| 2022/0329645 A1* | 10/2022 | Qin | H04N 21/4405 |
| 2023/0084969 A1* | 3/2023 | Homma | G06F 21/554 |
| | | | 726/28 |
| 2023/0125593 A1* | 4/2023 | Mahony | G06F 16/2365 |
| | | | 726/26 |

* cited by examiner

| | Line of Business 1 | | | | Line of Business 2 | | | | Line of Business 3 | | | |
|---|---|---|---|---|---|---|---|---|---|---|---|---|
| | Off-Shore | | On-Shore | | Off-Shore | | On-Shore | | Off-Shore | | On-Shore | |
| | Prod | Non Prod | Prod | Non Prod | Prod | Non Prod | Prod | Non Prod | Prod | Non Prod | Prod | Non Prod |
| Prod Support | Y | | Y | | Y | | Y | | Y | | Y | |
| Info Security | Y | Y | Y | Y | Y | Y | Y | Y | Y | Y | Y | Y |
| Business Analyst | | Y | | Y | | | | | | Y | | Y |
| Dev | | Y | Y | | | Y | Y | | | Y | Y | Y |
| Test | | Y | Y | | | Y | Y | Y | | Y | Y | Y |

INTELLIGENT DATA PROTECTION

CROSS-REFERENCE TO RELATED APPLICATIONS

This application is a continuation of U.S. patent application Ser. No. 16/783,968 filed Feb. 6, 2020, and entitled "INTELLIGENT DATA PROTECTION," which claims the benefit of U.S. Patent Application No. 62/805,050, filed Feb. 13, 2019, and entitled "INTELLIGENT DATA PROTECTION." The entirety of the above-mentioned applications is incorporated herein by reference.

BACKGROUND

Increasingly businesses, financial institutions, and other entities are storing sensitive data for customers, business purposes, or the like. Further, addition of more services or business lines can lead to sharing of data between elements, systems, and/or the like within a business's networked environment. The sheer quantity of data within enterprises makes it difficult to manage.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Data protection techniques are disclosed herein. Datasets associated with various computing environments or systems of an organization can be automatically scanned to discover data elements subject to protection, such as sensitive or confidential data. Further, data lineage associated with identified data elements can be determined. The data lineage can capture relationships between data and linkages between source and target computing environments or systems. Protection can subsequently be applied automatically based at least in part on the data lineage. Other factors that can influence the protection are level of sensitivity of the data as well as one or more policies or regulations. Audit functionality is also provided to log usage to, among other things, determine overall system health.

Artificial intelligence is employed to enable identification of sensitive or confidential data present in various formats or layouts including images and audio. Further, artificial-intelligence-based techniques can be employed to facilitate generation and use of personas to influence access control in view of compliance issues. In one instance, unsupervised learning can be utilized to discover data access clusters that can be employed to produce personas and supervised learning can be employed to match a user to a persona. Subsequently, a comparison can be made regarding the user and persona to make an access recommendation, which can comprise an access decision or level. Further, exception management can be provided to enforce access exceptions such as geographic location or application exceptions.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

For financial institutions and other enterprises or organizations, data is becoming a critical asset. In many instances, the data can be sensitive data, such as personally identifiable information (PII). For example, a bank can store and utilize customer information including name, mobile phone number, social security number, bank account numbers, as well as credit and debit card numbers. Various rules, policies, or regulations can dictate that such sensitive data be protected. However, the amount of such data can be vast and spread throughout numerous computer systems of an organization.

Aspects of the subject disclosure pertain to data protection. A system is provided to facilitate protection of data in accordance with one or more policies and regulations. For example, a privacy policy can dictate how sensitive data is stored, processed, and transmitted. Further, data relationships and linkage between computing environments or systems can be determined and maintained to enable an end-to-end understanding of data, for example from origination to consumption. Audit functionality is also afforded to enable inspection and evaluation of data in terms of compliance with one or more policies or regulations.

Furthermore, artificial-intelligence-based techniques can be employed to enhance data protection. In accordance with one aspect, discovery of sensitive data can employ such techniques to enable identification in various formats or layouts including images and audio. In accordance with another aspect, such techniques can be utilized to determine personas, assign personas to users, and determine access recommendations including access level based thereon.

Various advantages, benefits or the like are provided by aspects of the disclosure. One advantage resides in substantially complete knowledge of lineage of datasets. Another advantage resides in automated protection of datasets that include sensitive data or other data subject to protection. Yet another advantage is provided auditability. Other advantages include improved access control and intelligent processing.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
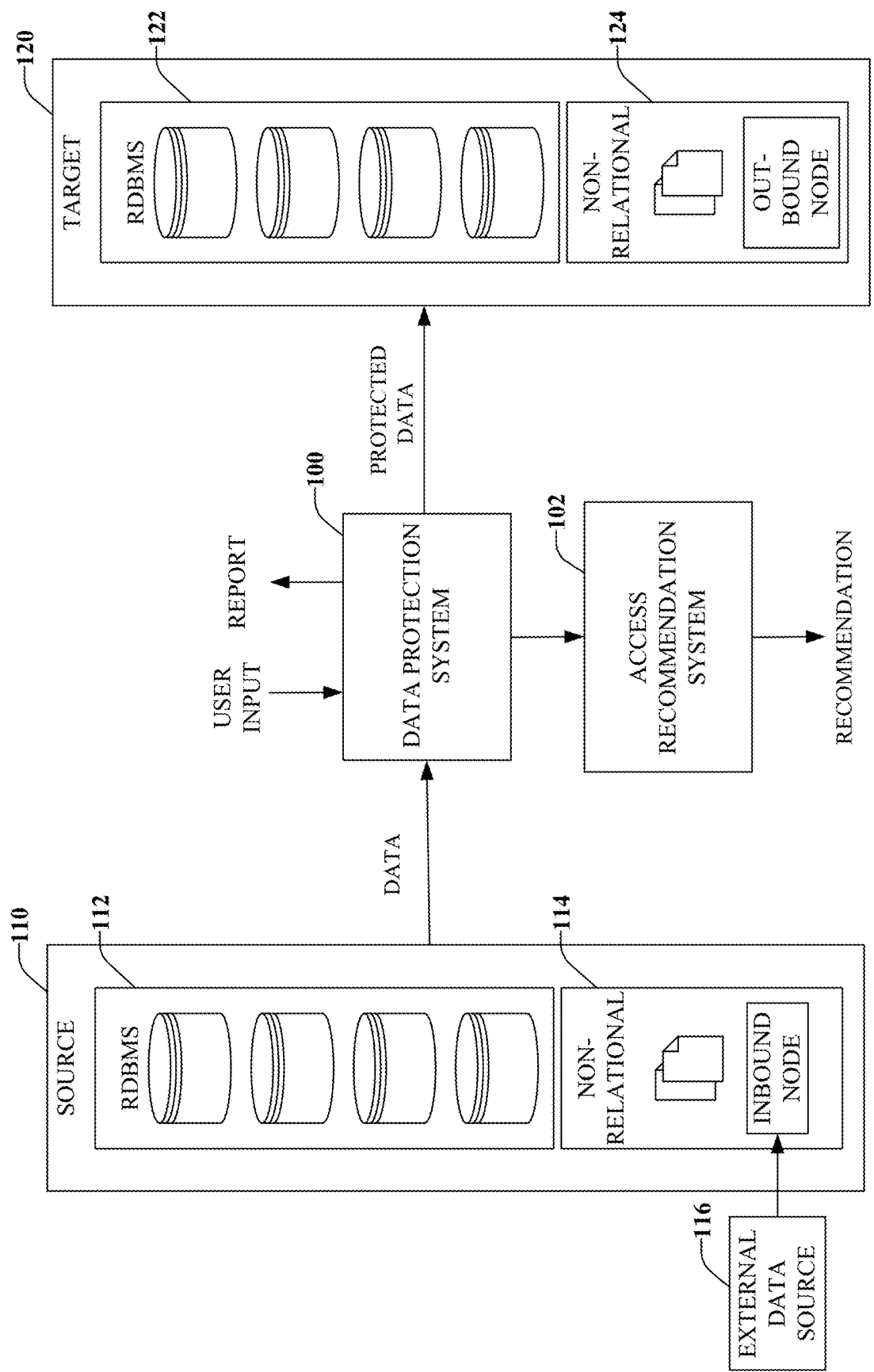
FIG. 1 illustrates an overview of an example implementation.

Referring initially to FIG. 1, an overview of an example implementation is illustrated and described hereinafter. As depicted, the implementation includes data protection system 100 communicatively coupled with a source 110 and a target 120. The data protection system 100 receives data from the source 110 and returns protected data to the target 120. For example, detected sensitive data can be protected by anonymizing the data. Further, the system 100 can receive user input and provide an output such as a report or other information regarding data. Overall, the system 100 provides end-to-end data lifecycle management including data protection.

The source 110 and the target 120 can encompass any system, environment, or application associated with storing or processing data including sensitive and non-sensitive data. More particularly, the source 110 and the target 120 can include a plurality of relational database management systems (RDBMSs) 112 and 122 as well as non-relational data sources 114 and 124. The RDBMSs 112 and 122 can be any type or brand (e.g., Oracle, SQL, DB2, Teradata . . . ). Similarly, the non-relational data sources can be of varied type or kind (e.g., Hadoop, MongoDB, NoSQL . . . ). Further, the source 110 can receive data from an external data source 116. For example, the source 110 can receive status updates or other data in real time or in near real time. In accordance with one particular embodiment, the source 110 and the target 120 can correspond to development, testing (e.g., system integration, user acceptance . . . ), or production environments for a single organization.

The data protection system 100 can interact with a plurality of heterogeneous data sources. Further, the types of data from the heterogeneous data sources can vary, such as sensitive or non-sensitive. Personal data can be considered sensitive. Personal data includes data revealing racial or ethnic origin, religious beliefs, genetic data, biometric data, health-related data, and data concerning sexual orientation, among other things, concerning a person. Data can also be confidential or non-confidential, wherein confidential data is of a type protected by law or contractual agreement against unauthorized access, modification, storage, or use. By contrast, data can be public, including non-sensitive and non-confidential data, with no restriction on access or use.

The data protection system 100 can acquire and classify data from the source 110. For instance, data elements can be classified as sensitive or non-sensitive, confidential, or public. Further, a level of sensitivity or the like can be determined to capture varying degrees of sensitivity (e.g., high, medium, low). For example, a social security number be a higher level of sensitivity than a phone number. In some instances, laws or regulations can cause data to be classified as high sensitivity such as health-related data.

After data is classified, a determination can be made regarding whether or not the data should be protected. For example, sensitive personal and confidential data can be protected, while public data need not be protected. If data is to be protected, a determination can be made with respect to an appropriate type of protection based on the data and context. For instance, the data can be anonymized, hashed, or encrypted based on level of sensitivity and target use. In one instance, the level of sensitivity can be utilized to determine which type of protection is appropriate. Instead of merely permitting or denying full access to data, risk can be mitigated by applying appropriate protection to data. Protected data can then be communicated to the target for storage and subsequent utilization.

The data protection system 100 can also determine and record lineage from sources to targets. The lineage can be determined by identifying relationships and linkages between data sources and targets. For example, a relationship can be determined between user accounts and a linkage can be between a production environment system and a non-production environment system. In this manner, a particular column of a table can be identified associated with data of interest as well as a specific database, application, and source system. Lineage can be utilized for risk and regulation compliance, among other things. In one instance, lineage can be utilized to determine whether or not data should be protected, and, if so, what type or level of protection is appropriate. For example, if production data is being transitioned to a testing system to facilitate identification of a bug, sensitive production data should be protected. Further, hashing might be selected in this scenario to preserve metadata regarding the data that would be helpful in identifying a cause of program crash or return of invalid output while also protecting the data from alternate uses.

The data protection system 100 can support user interaction by accepting user input and providing responsive output. In one instance, a user can request information regarding particular data. In response, the data protection system 100 can produce and return a report. In one embodiment, such information can be utilized to check if data is protected. In another embodiment, a report can be generated to prove compliance. Overall, such functionality can be employed to make environments, such as source 110 and target 120, auditable.

The access recommendation system 102 is configured to make a suggestion or recommendation regarding access to protected data based on compliance with particular rules or regulations. The access recommendation system 102 can identify exceptions in which access should not be permitted to comply with one or more rules or regulations. In other words, a user may have permission to access data, but in some cases, that permission can be revoked. There can be many access exception dimensions. One example access exception is location. For instance, sensitive or confidential data can be accessible to solely those who are currently geographically located in the United States. Consequently, if a user, who is generally permitted to access such data, is currently located outside of the United States, a recommendation can be generated to deny access. Another example access exception can be application. For example, a rule can be set that use is restricted for a particular application such as marketing. In this scenario, a recommendation will be generated to deny access to all members of a marketing department due to the restriction on use. Here, the access recommendation system 102 is proactively seeking to ensure compliance. In one instance, the recommendations can be automatically implemented by an access control system subject to override by input of a human administrator.

Figure 2:
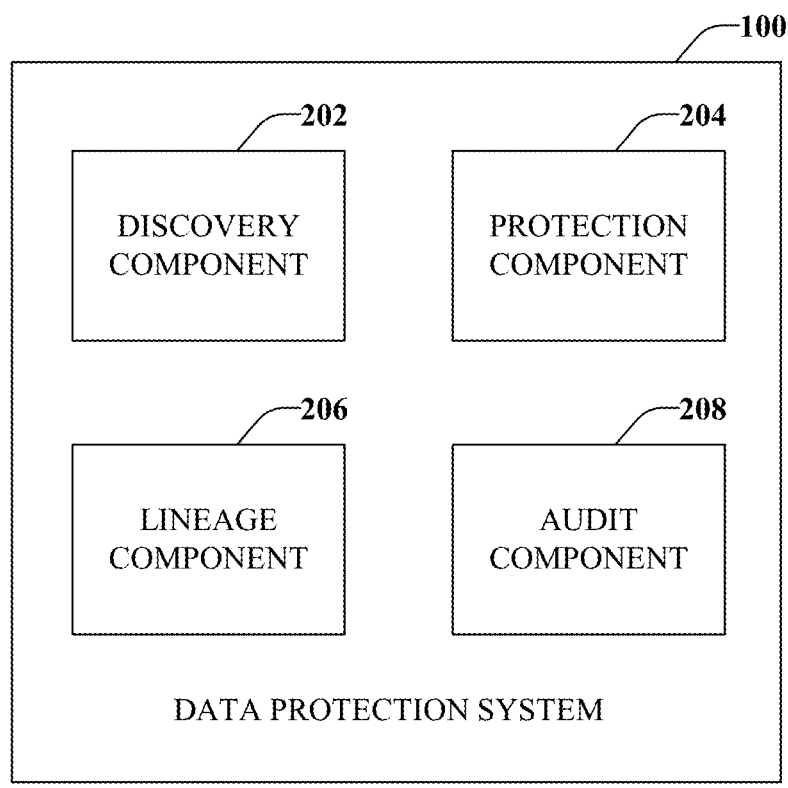
FIG. 2 is a schematic block diagram of a sample data-protection system.

FIG. 2 illustrates the data protection system 100 in further sample detail. More specifically, the system 100 comprises discovery component 202, protection component 204, lineage component 206, and audit component 208. In one embodiment, these are computer executable components that when executed cause the computer to implement functionality of the data protection system 100.

The discovery component 202 is configured to receive, retrieve, or otherwise obtain or acquire a dataset associated with one or more computer systems or environments. The dataset can comprise a number of data elements some of which may concern sensitive or confidential data subject to protection. For example, a dataset can include a credit card number, social security number, account number, or medical data, among other things. In accordance with one embodiment, the discovery component 202 can be implemented as a background or on-demand scanner that reads, analyzes, and saves metadata regarding a dataset. Alternatively, application-programming interfaces (APIs) can be developed for various environments or systems to facilitate access and analysis of data.

In some instances, the discovery component 202 can read data from elements or source systems such as production systems, test systems, relational database management systems, non-relational databases (e.g. HADOOP, Big Data, Unstructured, Images, PDF etc.), file systems (e.g. mainframes), SAS, files (e.g. Excel, fixed width, delimited, etc.), and/or the like. The discovery component 202 can access source systems by way of connection strings available as part of a search tool package. Further, the discovery component 202 can access source systems in different stages (e.g. data at rest, data in motion, data in use . . . ).

In one particular instance, the discovery component 202 can be configured to classify a dataset as sensitive or non-sensitive based on predetermined custom rules. In some embodiments, the predetermined rules can identify a type of sensitive data, customer type, account type, and/or the like. In other embodiments, the predetermined custom rules are governed by regulatory rules and/or business rules. For example, sensitive medical data is governed by Health Insurance Portability and Accountability Act regulations for protecting personally identifiable information. Further, discovery component 202 can identify a level of sensitivity associated with data in accordance with predetermined rules or regulations to facilitate a subsequent determination regarding appropriate protection.

In some embodiments, the discovery component 202 can read the data of the dataset to identify patterns by way of a pattern-matching algorithm. For example, credit card numbers are generated using a Luhn algorithm. The discovery component 202 can use the same pattern-matching algorithm to match patterns of data in the dataset to find suspected sensitive data. In other embodiments, the discovery component 202 can scan the dataset at a row level to identify personal information and suspected data or attributes associated with sensitive information (e.g. personally identifiable information) using a library, patterns, sample data, and/or the like.

The discovery component 202 is also configured to identify who accessed data and when it was accessed, among other things. Such information is typically managed by each particular data store. In accordance with one aspect, the discovery component 202 can contact and request access information from each data store including user name and access data and time. In one instance, access information can be acquired for solely sensitive or confidential data. In another instance, access information for all data can be requested and obtained.

The protection component 204 is configured to protect sensitive and confidential data identified by the discovery component 202. The protection component 204 can first determine a level of protection to be applied to data based on the type of data, sensitivity level, as well as other context, such as target use. Once a level of protection is determined, a corresponding protection mechanism can be identified and subsequently applied to protect data. For instance, data can be masked, hashed, encrypted, or tokenized. Such mechanisms can be employed to anonymize sensitive data to prevent the data from being stolen by malicious entities. Consider data such as the name "Swapnil." The name can be masked to "Shanmukh," hashed to "######IL," encrypted to "W!@#rtyy," or tokenized to ""!23DESR."

In some embodiments, the protection component 204 can comprise inbuilt algorithms and self-identifying capabilities to apply data protection rules at a row, column, and/or record level. The data protection rules can be based on multiple factors for example environment, platform, geography, countries that are more vulnerable, and/or the like. In other embodiments, predetermined custom rules are governed by regulatory rules and/or business rules. For example, sensitive medical data is governed by Health Insurance Portability and Accountability Act regulations for protecting personally identifiable information. Data classification can govern how the sensitive data is protected and stored. The protection component 204 can use self-identification and implementation to ensure appropriate protection techniques to secure the data and/or datasets from possible vulnerabilities. The protection component 204 can apply row level protection for every customer and associated sensitive data based on customer contracts and context for enhanced security.

The lineage component 206 is configured to determine and track movement over time from data origination, for instance based on data relationships and linkage across environments or systems. In other words, the lineage component 206 is responsible for determining the lifecycle of data. Determined lineage is useful in safeguarding against, or mitigating risks associated with, legal or other duties associated with storing and processing data. For example, an entity can be liable for a breach of security that results in exposure of sensitive data. Data lineage can assist in mitigation of risk based on an understanding provided by the lineage component 206 of where data is at any given point in a process and where the data is going.

Figure 3:
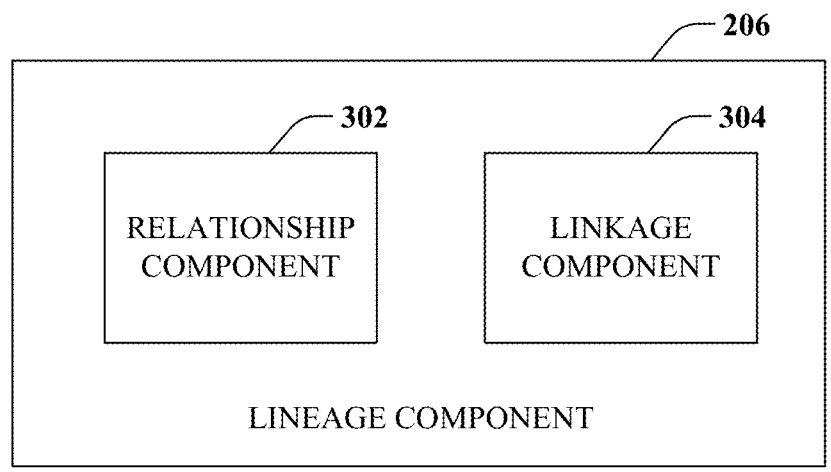
FIG. 3 is a schematic block diagram of a sample lineage component.

Turning attention to FIG. 3, the lineage component 206 is illustrated in further example detail. Here, the lineage component 206 comprises relationship component 302 and linkage component 304. The relationship component 302 can determine relationships amongst data including inter-relationships between data of different datasets. In one instance, the relationship component 302 can identify parent-child, hierarchy and other similar or inter-related data. Consider a bank customer, for example. The customer might have two accounts one associated with a credit card and another associated with a checking or savings account. The relationship component 302 can determine the relationship between accounts based on the customer.

The linkage component 304 can be configured to determine and track data across systems or processes. In other words, the linkage component 304 determines where data is coming from and where it is going, such as from origination system to target. For instance, data can originate from a retailer for an auto loan that after the application is approved is provided to another system for analytical usage. In one particular implementation, the relationship data generated by relationship component 302 can be employed as a basis for determining linking by linkage component 304. Together, the relationships and linkage determined by relationship component 302 and linkage component 304 identify an end-to-end lifecycle of data useful for risk and regulation compliance.

Further, data lineage determined by the lineage component 206 can be employed to determine an appropriate type of protection such as anonymization or encryption. By way of example, consider a scenario in which data identified as sensitive is being communicated from a production environment to a non-production environment for example for testing purposes. In this scenario, it can be desirable to anonymize by way of masking as opposed to encryption to maintain metadata associated with the data for testing (e.g., form of a social security number, credit card . . . ). By contrast, if the data is moving from a non-production environment to a production environment it may be more effective to encrypt the data.

Returning attention briefly to FIG. 2, the data protection system 100 also includes the audit component 208. The audit component 208 is configured to perform data assessment, for example to ensure compliance with one or more policies or regulations. Stated differently, the audit component 208 can assess data fitness with respect to a given purpose such as compliance. The audit component 208 can accept input from one or more users regarding the given purpose as well as data of interest and return a responsive assessment or report. In one instance, the audit component 208 can be employed to facilitate investigation by auditors of a regulatory agency by providing answers to questions regarding handling of data.

Figure 4:
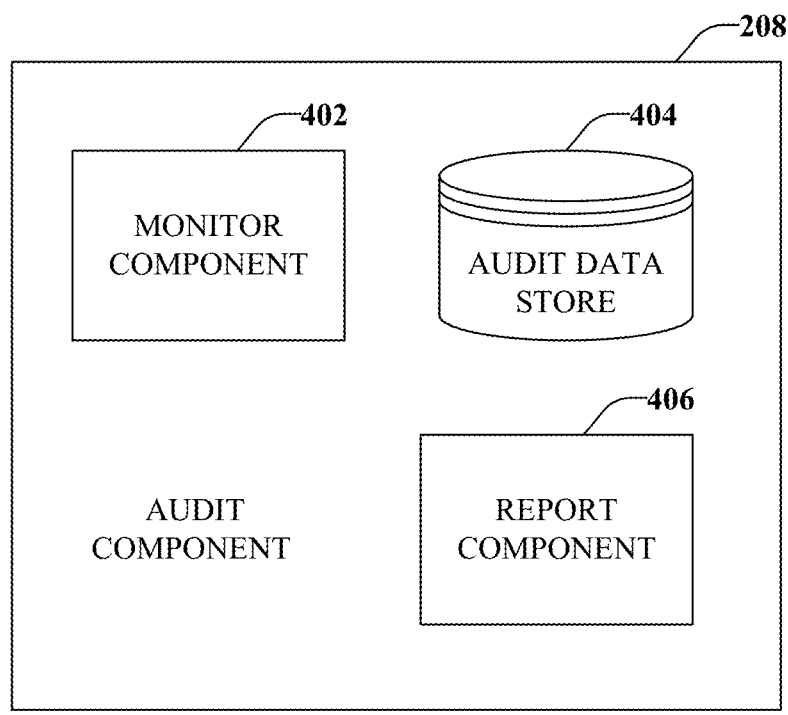
FIG. 4 is a schematic block diagram of a sample audit component.

Turning to FIG. 4, the audit component 208 is depicted if further sample detail. Here, the audit component 208 includes monitor component 402, audit data store 404, and report component 406. The monitor component 402 can monitor interactions with one or more data sets. For example, data, and the form of data (e.g., anonymize, encrypted . . . ), communicated from a source to a target, can be monitored. Further, relationships, linkages, and operations performed with the data (e.g., create, modify, delete . . . ) can also be observed. In addition to monitoring, the monitor component 402 can log or store information regarding data to the audit data store 404. The audit data store 404 can be a non-volatile computer-readable storage medium that houses audit trails or logs associated with the data monitored. The report component 406 can query the audit data store 404 to acquire audit trails, logs, or other information to satisfy a user request or predetermine criteria. The report component 406 can subsequently generate a report or other type of response populated with received data from the audit data store 404. In one instance the audit component 208 can facilitate compliance audits, such as data governance activities for regulatory reporting. Additionally, the audit component 208 can ensure that protection is not re-applied multiple times to data by identifying whether data is protected or not.

Figure 5:
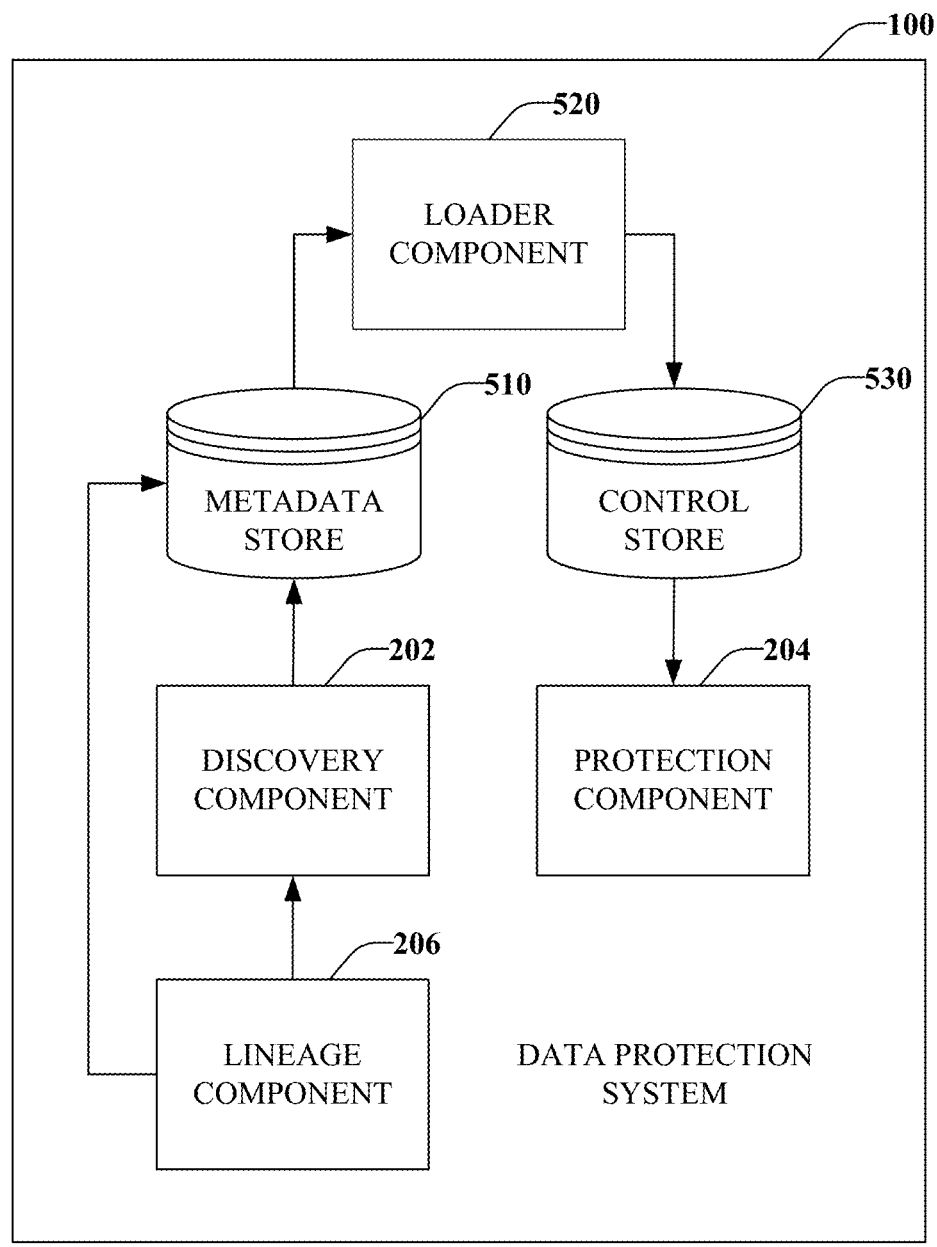
FIG. 5 is a schematic block diagram of a sample data-protection system.

FIG. 5 illustrates an example implementation of the data protection system 100. Similar to FIG. 1, the data protection system 100 includes the discovery component 202, protection component 204, and lineage component 206. Additionally, the data protection system 100 includes metadata store 510, loader component 520, and control store 530. The data protection system 100 enables entities to know and protect their data.

The discovery component 202 is configured to identify data and classification of the data (e.g., sensitive, non-sensitive, confidential, public . . . ) including level of sensitivity, for instance. The discovery component 202 can be implemented as a data-screening crawler that connects to systems by way of open database connectivity (ODBC) connection, or other mechanism, and crawls in the background similar to a virus scan to identify data and its classification. Classification can be performed with one or more different techniques, such as by reading metadata or data and identifying a pattern match indicative of class. In addition, the discovery component 202 can be configured to receive, retrieve, or otherwise obtain or acquire access information (e.g., data access pattern) from data stores such as a user name as well as date and time of access. Results can be saved to the metadata store 510, which corresponds to a non-volatile computer-readable storage medium. In other words, results of the crawling and classification can be flagged in the metadata store 510.

In accordance with one embodiment, automatic identification of data and classification of the data can be performed with minimum false positives, for example by comparing results of multiple scanning types. For instance, a schema or metadata of a source data set can be read and compared with predetermined metadata to determine whether the metadata is suspect. Next, the data can be read, a pattern identified, and then the data classification determined based on the patterns and sample data. If the results of the two different scanning techniques conflict, there is a likelihood of a false positive and a validation flag can be triggered.

The protection component 204 is triggered by data in control store 530. The discovery component 202 saves metadata regarding identification of sensitive or confidential data. Loader component 520 is configured to receive metadata associated with sensitive or confidential data from the metadata store 510 and alter the control store based on the metadata. The protection component 204 is triggered to protect the identified data in an automated, batch, or ad hoc process based on adjustments of the control store by the loader component 520.

The loader component 520 provides an operational layer. Metadata of results sets from the discovery component 202 can be ingested into the control store 530, which can be a table, by way of an extract transform load (ETL) batch pull process with checks to determine whether the metadata is existing or new. If the metadata is new, it can be inserted into the control store 530. If the metadata already exists, an update or no action can be performed with respect to the control store 530. The data store in the control store 530 can be used to automate protection, by the protection component 204, based on identification of data subject to protection, by the discovery component 202.

The data protection component 204 can comprise inbuilt algorithms and self-learning capabilities on implementation of data protection rules at a row, column, or record level. The data protection rules can be based on multiple factors such as environment, platform, geography, and country vulnerability statistics, among other things. In one instance, self-learning and implementation capabilities can ensure multiple protection techniques are put in place to secure data from possible vulnerabilities. For instance, the protection component 204 has options of data masking (e.g., Swapnil→Shanmukh), hashing (e.g., Swapnil→######IL), encryption (e.g., Swapnil→W!@#tyy), and tokenization (e.g., Swapnil→!23DESR). Further, row-level protection can be established for every customer and associated personal/sensitive information based on customer contracts and context for enhanced security.

The lineage component 206 is configured to determine data lineage. Data lineage generally corresponds to tracking movement of data over time, namely where data originates, and where it is going as well as transformations that are applied. The lineage sets forth the life cycle of data. The lineage component 206 can identify parent-child, hierarchy, and inter-related data as well as linkages with other environments or systems. In accordance with one embodiment, the lineage component 206 can work in concert with the discovery component 202 during a scan or crawl of data to identify related attributes, relationships between datasets when data is a rest, thus resulting in lineage from source to target, and well as row-level association of data. Further, identified relationships can be fed back to the data discovery component 202 to aid in locating sensitive or confidential data.

The data protection system 100 can provide a one-stop solution that enables enterprise personally identifiable information (PII), sensitive data, and confidential data registry by way of the discovery component 202 running a scanning process in batches/automated fashion, and generating an alert if such data is found. Further row-level relationship and lineage can be performed. Data discovery and protection can be closely monitored by way of logs generated by every process/step. The logs can be stored and utilized to determine overall application or system health.

Figure 6:
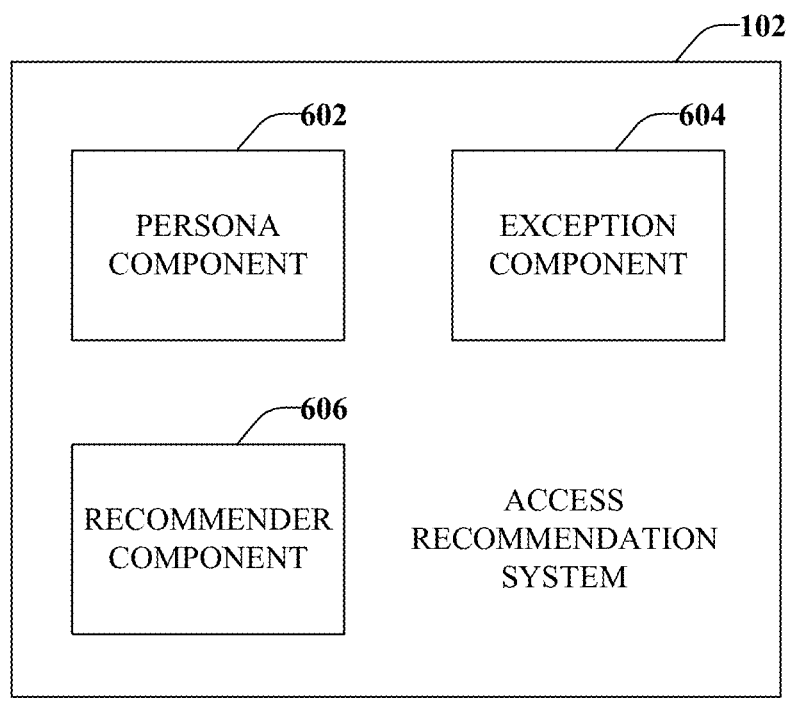
FIG. 6 is a schematic block diagram of a sample access-recommendation system.

FIG. 6 depicts a sample access recommendation system 102. The access recommendation system 102 generates recommendations or suggestions as to whether or not a user should be provided or denied access to data to ensure compliance with policies or regulations. The system 102 includes persona component 602, exception component 604, and recommender component 606.

The persona component 602 is configured to generate personas. A persona is a representative user that includes various attributes such as role, location, and processing environment, among others. A persona is a semi-fictional user meaning a persona can be generated based on real users but is not a real user, but rather a representative user. One or more personas can be generated by the persona component 602 based on data access information associated with real users, which can include a user role, location, and processing system or environment in which data originates or is consumed. In accordance with one embodiment, personas can be generated by way of an unsupervised machine-learning process over discovered data. The machine learning process can identify meaningful clusters or sets of data from which personas can be generated. In other words, segmentation analysis can be performed to facilitate creation of personas.

Figure 7:
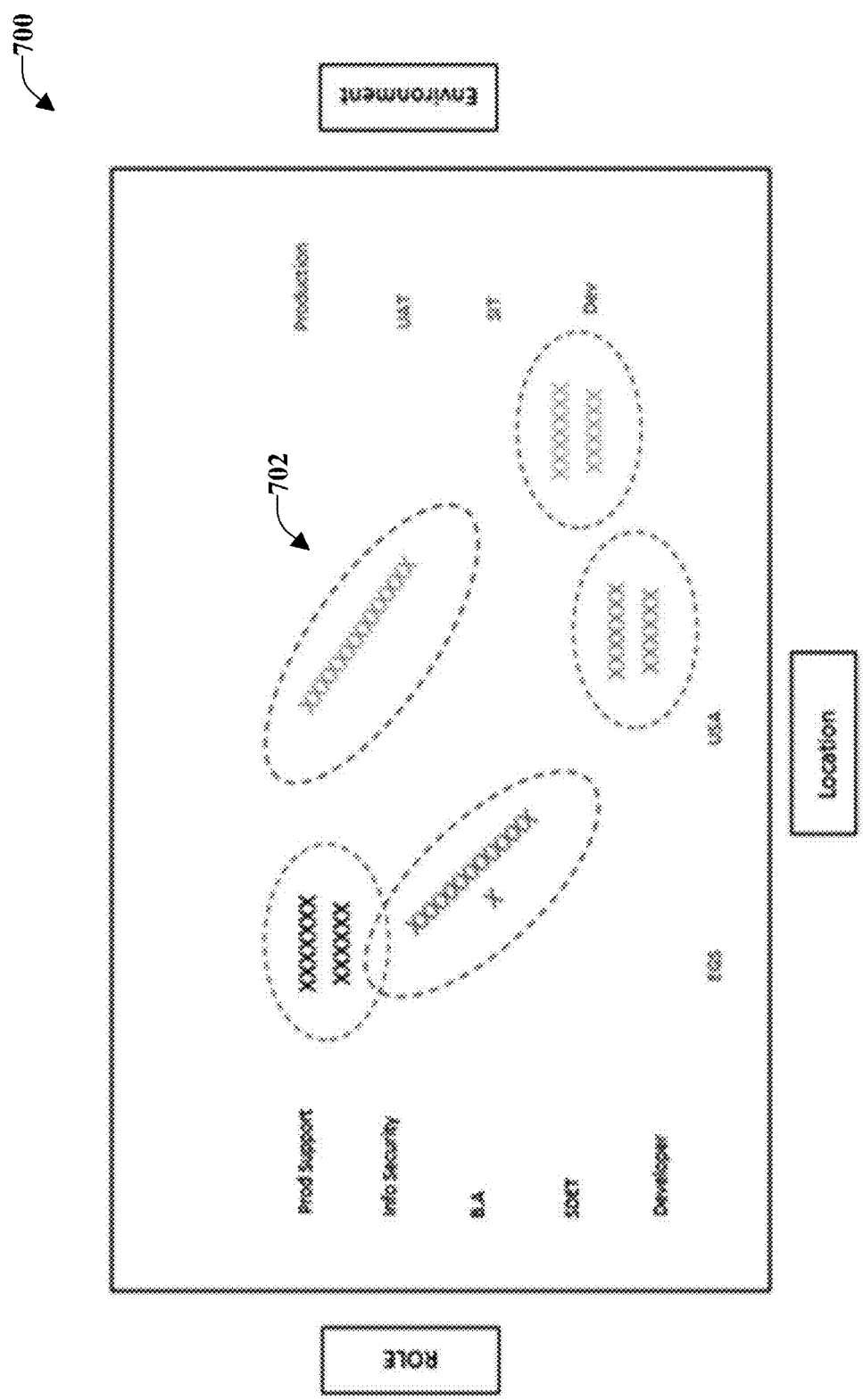
FIG. 7 is a cluster graph.

Turning attention briefly to FIG. 7, a cluster graph 700 is illustrated to facilitate clarity and understanding. The cluster graph 700 identifies three dimensions, namely, role, location, and processing environment. The role is one of product support, information security, business analyst, SDET, which is a mixture of developer and tester, and developer. Location is either inside or outside the United States of America (U.S.A.). Processing environment includes production, user acceptance testing (UAT), system integration testing (SIT), and development. With respect to these dimensions, clusters 702 of users are identified. For example, it is clear that developers are located in the U.S.A., and employ a development-processing environment. By contrast, product support is provided outside the U.S.A. and employs the production environment. Accordingly, two personas can be generated associated with a developer role and a product support role. Further, these can further be divided in terms of particular lines of business.

Figures 8A, 8B:
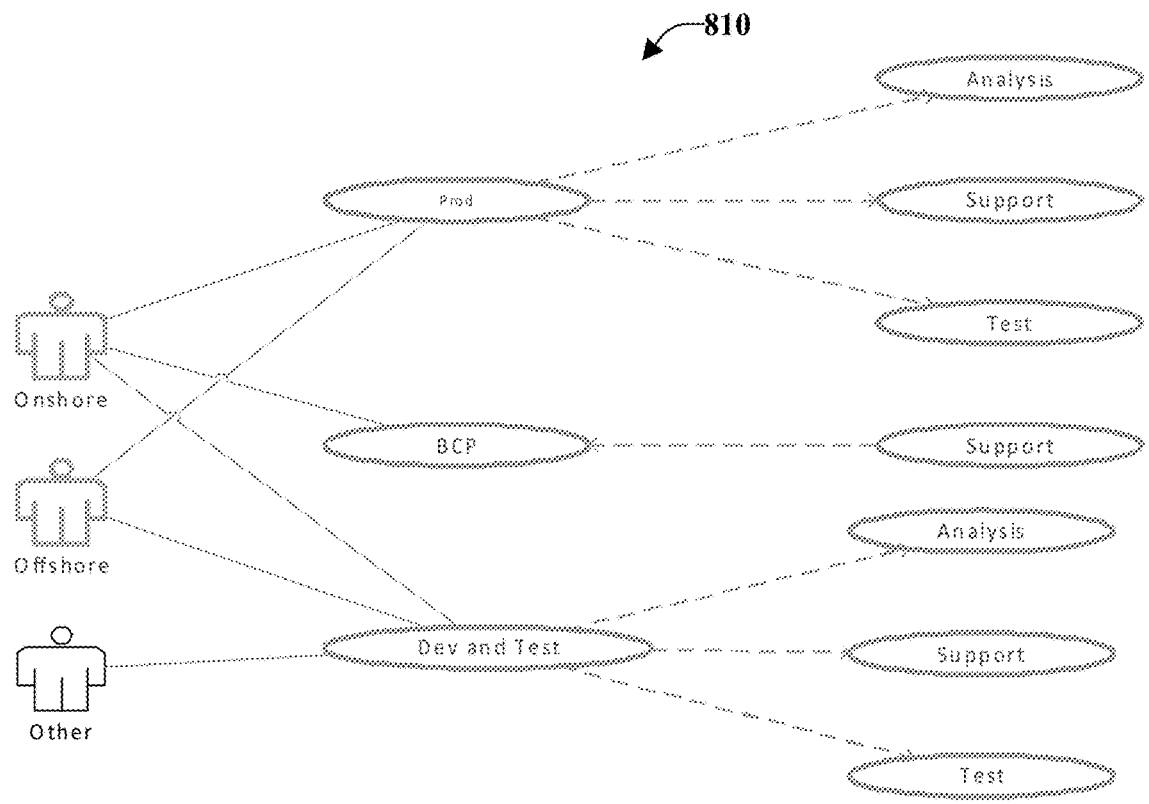
FIG. 8A is a graph of a matrix of options.
FIG. 8B is a uniform modeling language diagram.

FIG. 8A illustrates a table 800 capturing a matrix of options. In addition to clustering, association rules for groups can exist. A user can be in more than one cluster or group depending on data access patterns. The matrix of options is captured by the table 800. Here, three different lines of business (e.g., Line of Business 1-3) are subdivided into onshore and offshore access, which are further divided into production or non-production processing environments. Roles listed on the leftmost vertical portion of the table include product support, information security, business analyst, development, and test. The intersecting cells between the subdivided lines of business and roles include a "Y" indicating allowable access. For example, for line of business 1 product support can access data by way of a production environment on or off shore (e.g., inside or outside U.S.A.). By contrast, a business analyst can only access data through a production environment on-shore. Further, testers can only access data by way of a non-production environment for one line of business, while for other lines of business, a tester can access data through production and non-production environments.

FIG. 8B is a uniform modeling language diagram 810 associated with implementation of association rules. Starting from the left, the location dimension is represented (e.g., onshore, offshore, and other), followed by processing environment production and non-production (e.g., business continuity planning (BCP), development and test), and role (e.g., analysis, support, test . . . ).

Returning to FIG. 6, the exception component 604 is configured to facilitate recommending denial of access in certain exceptional circumstances to mitigate liability associated with at least policy non-compliance. One circumstance can be location, such as whether the user is geographically located in the United States of America. Regardless of whether a user otherwise has the credentials to access data, a recommendation can be impacted by geographical location. For example, consider a critical application development lead residing outside the border of the U.S.A. Even if the lead previously had access, the location exception causes access to be revoked or denied. Another circumstance can be an application or use exception. For instance, a contract could indicate that data is restricted for use for marketing purposes. In other words, there is a line of business exception. Consequently, the data will not be accessible by anyone on the marketing team. If the next day, however, the contract is updated to indicate there is no issue with use for marketing purposes, such consent can be carried forward automatically to permit or recommend such data access be permitted. In this way, exceptions can be managed by the exception component 204.

The recommender component 606 is configured to generate a recommendation to permit or deny access based on policy or regulatory compliance issues In one instance, the recommendation can be communicated to a control component (not shown) that regulates access and utilizes the recommendation as an input. The recommender component 606 can consider input from the persona component 602 and the exception component 604 in generating a recommendation. With respect to persona, a user associated with a data access request can be analyzed in attempt to identify a corresponding persona. For example, supervised learning can be employed to make such a classification. Once classified, the data access request will be analyzed to determine whether or not the request is consistent with data access associated with the persona. For example, if the user has a development or testing role and the request is for data from a development environment, the access is consistent. However, if the same user is requesting data from a production system, the request is inconsistent. Consistent requests can be recommended for access while denial of access recommended for inconsistent access. Similarly, the user access request can be compared with known exceptions from the exception component 604. If there is an exception that is applicable, the recommender component 606 can recommend denial of access. Otherwise, the recommender component 606 can recommend permitting access.

The aforementioned systems, architectures, platforms, environments, or the like have been described with respect to interaction between several components. It should be appreciated that such systems and components can include those components or sub-components specified therein, some of the specified components or sub-components, and/ or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. Both the data protection system 100 and the access recommendation system 102 can employ such mechanisms. By way of example and not limitation, the discovery component 202 can employ such mechanism to discover data from various formats beyond structured data including images and audio. As other non-limiting examples, the persona component 602 can employ such mechanisms in clustering and determining personas, and recommender component 606 can utilize these techniques to improve recommendations based on context and historical data.

In view of the exemplary systems described above, methods that may be implemented in accordance with the disclosed subject matter will be better appreciated with reference to flow chart diagrams of FIGS. 9-12. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 9:
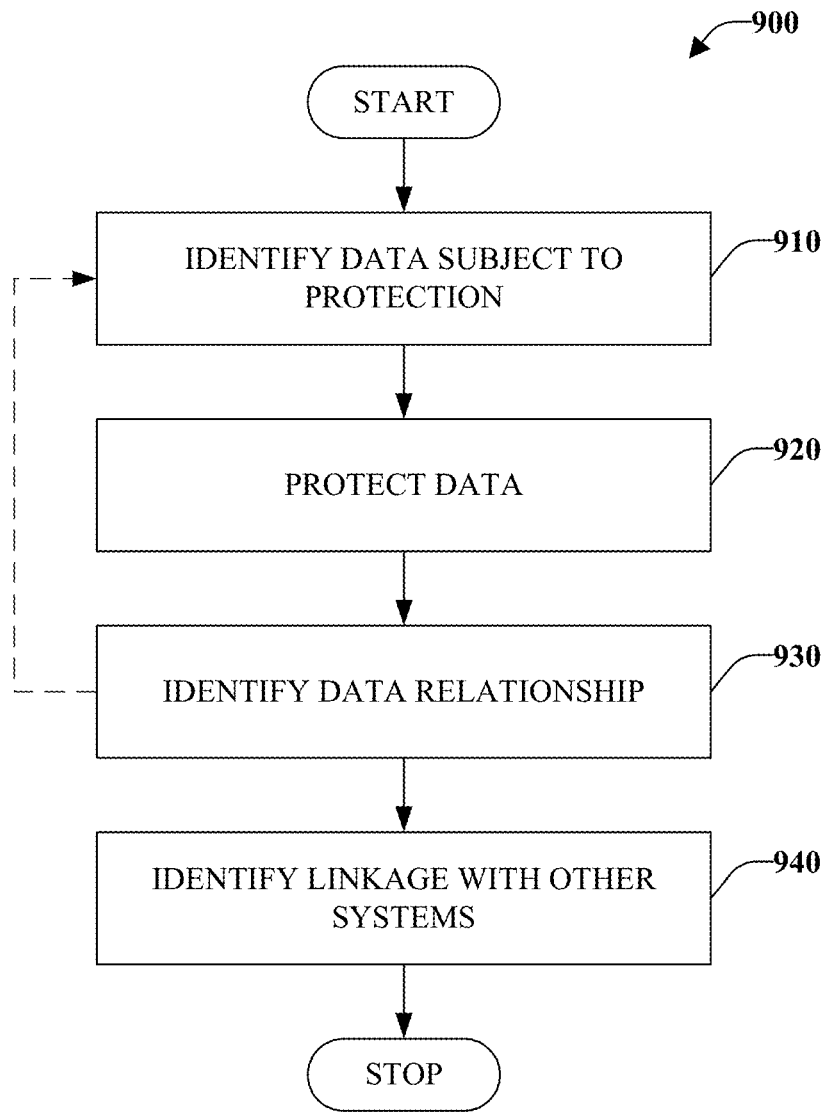
FIG. 9 is a flow chart diagram of a data protection method.

FIG. 9 illustrates a data protection method 900 in accordance with an aspect of this disclosure. The method 900 can be performed by the data protection system 100 and components thereof. At reference numeral 910, data subject to protection can be identified. Data subject to protection can include sensitive or confidential data including personally identifiable information. The data can be identified by analyzing metadata associated with the data or the data itself. For example, pattern matching can be employed to identify addresses, phone numbers, or social security numbers, among other things. In accordance with one embodiment, the identified information can be preserved by recording location of the data in a metadata store or otherwise tagging the data as such. In one implementation, the identification of the data subject to protection can be performed with a data scanner or the like and metadata (e.g., data about data). Further, data subject to protection can be captured, stored centrally, and external from other environments or systems.

In one instance, the structured data in system or environment platform repositories can be scanned. However, various other unstructured data in different forms or layouts can also be analyzed including images and audio. For example, machine learning-based image recognition and voice analysis can be employed to identify sensitive data in images or audio.

Additional metadata can be identified including data access patterns. Various systems and platforms track data access patterns including the identity of the user accessing data (e.g., create, read, update, delete) as well as when the data is accessed. Such data can be requested and acquired at least for data identified as sensitive or confidential.

At numeral 920, protection is applied to the identified data. Identification of data subject to protection can trigger application of protection by way of masking, encryption, or tokenization, among others. Data masking refers to a function applied to obfuscate or anonymize data, for example by way of character replacement. In this case, vital portions of data, such as the first five digits of a social security number, are obscured and typically unrecoverable. Data encryption transforms data into a scrambled unreadable form. However, the data is recoverable. In other words, encryption is reversible. Tokenization generates a random value, called a token, to replace an original value, and when the original value is needed, the token is used to look up the original value. There is no way to determine the original value solely based on the token as it merely references a location where the original resides. Data protection rules can be utilized to determine which technique to employ based on a variety of factors. Such factors can include but are not limited to environment, platform, location, government regulations, and business policies.

At 930, relationships with the data are identified. More specifically, relationships amongst data including inter-relationships between data of different datasets are identified. For instance, the relationship can be parent-child, hierarchy, or other inter-related data. Consider a bank customer, for example. The customer might have two accounts one associated with a credit card and another associated with a checking or savings account. The relationship component 302 can determine the relationship between the credit card and checking or savings accounts based on the customer. The relationship data can also be optionally fed back to facilitate discovery of data subject to protection, as denoted by the dashed arrow.

At reference numeral 940, linkages with other systems are determined. Linkage is associated with determining where data is coming from and where it is going, such as from origination system to target. For instance, data can originate from a retailer for an auto loan that after the application is approved is provided to another system for analytical usage. In one particular implementation, the relationship data can be employed as a basis for determining linkage. Together, the relationships and linkage identify an end-to-end lifecycle of data useful for risk and regulation compliance, among other things.

Figure 10:
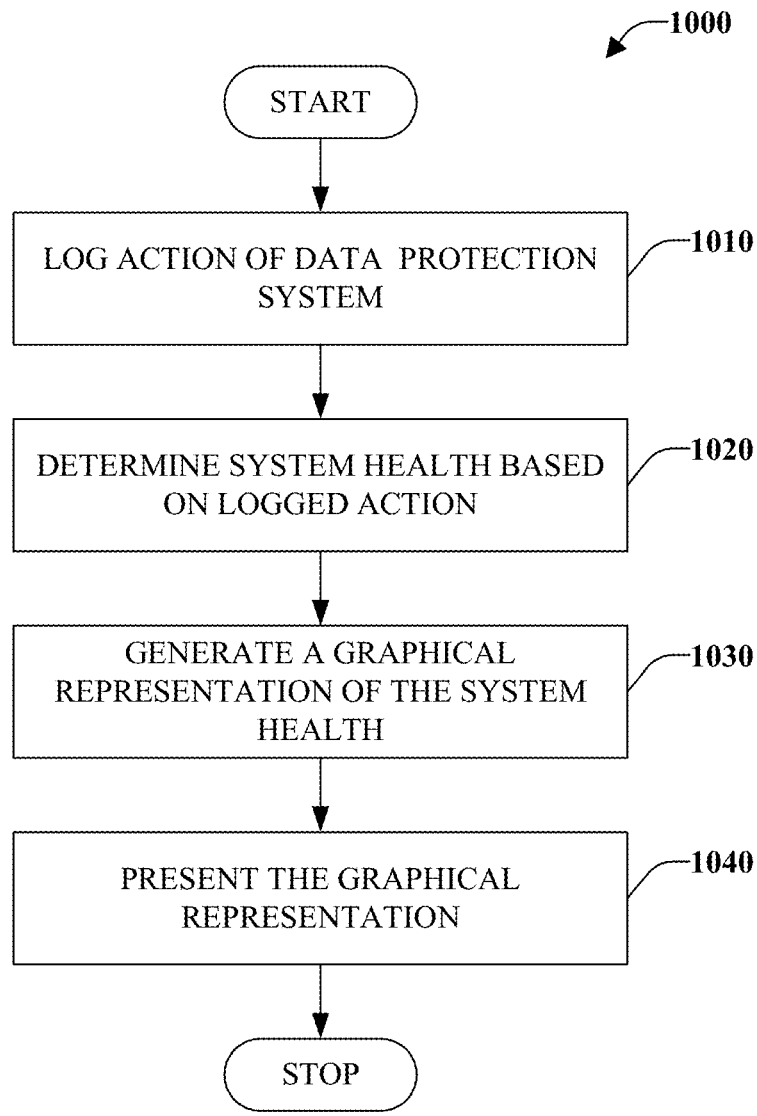
FIG. 10 is a flow chart diagram of a method of interacting with a data protection system.

FIG. 10 is a flow chart diagram of a method 1000 of interacting with a data protection system is depicted. Described functionality can be implemented by the data protection system 100 and components thereof such as audit component 208. At reference numeral 1010, actions of the data protection system can be logged. Such actions can include applying protection to data as well as identification of relationships and linkages associated with the data. At 1020, system health can be determined or inferred based on logs of actions. For example, system health can refer to compliance with regulations or policies such that a system in good health refers to one that is compliant while a system in poor health is noncompliant. At 1030, a graphical representation of the system health is generated. For instance, the representation can be an interactive graphical interface, a graph, chart, or the like. The graphical representation can be conveyed for presentation of the graphical representation on a display of a display device at 1040. In one embodiment, the graphical representation can be interactive to allow a user to view system health at varying levels of granularity (e.g., roll up, drill down). The graphical representation can also correspond to a report that can be provided to regulators as evidence of compliance. Further, specific data can be searched to determine whether or not the data is protected to avoid duplicative protection effort.

Figure 11:
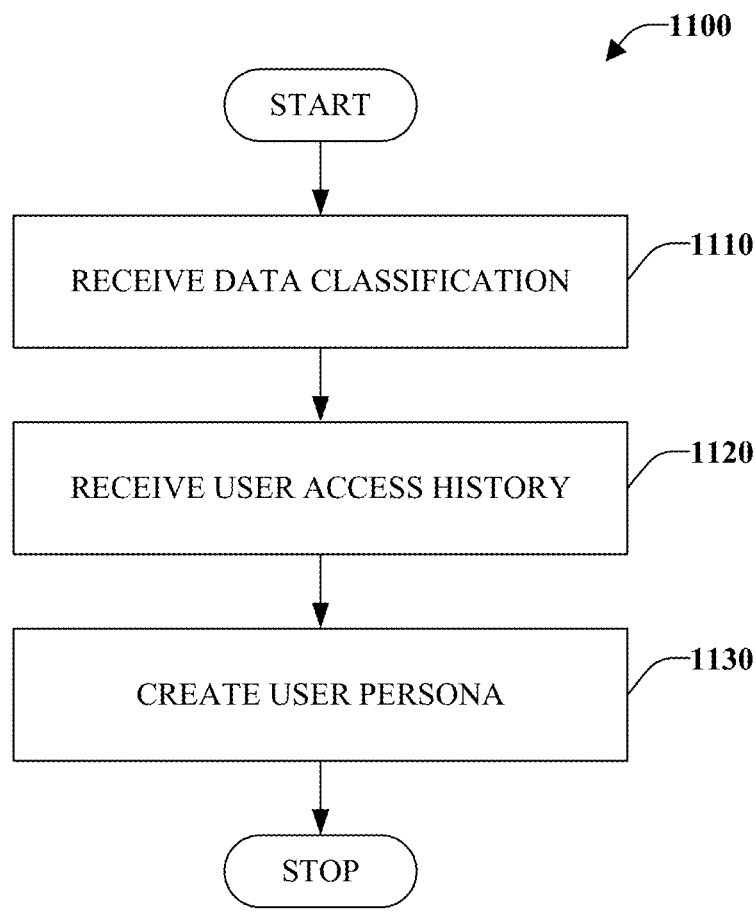
FIG. 11 is a flow chart diagram of a method of persona generation.

FIG. 11 depicts a method of analysis 1100 associated with protecting system 102 and components thereof including threshold persona component 602. At numeral 1110, classification of data is received, retrieved, or otherwise obtained or acquired. The classification data can include data regarding sensitive or confidential data including type, location, and level of sensitivity, for example. At 1120, user access history 1120 is received, retrieved, or otherwise obtained or acquired. The access history includes at least identities and times of data access by users particularly as it relates to sensitive data, although not limited thereto. In accordance with one embodiment, one or both of the data classification and access history can be acquired from the data protection system 100, or more specifically a data repository or catalog maintained by the data protection system 100. At numeral 1130, one or more user personas are created on the bases of user access history over sensitive or confidential data. A persona is a fictional or semi-fictional representative user. In other words, the user is not a real user but rather a representative user generated based on attributes or features of real users. Segmentation analysis can be performed to produce segments or clusters of data that can be employed to determine a persona. In accordance with one embodiment, unsupervised machine learning can be employed to identify data clusters. The clusters can capture data accessed by users as well as various characteristics of users and context. For instance, data access can be clustered by user role, location, and computer system or environment utilized. Data from each cluster of data can be utilized to determine a persona representative of the cluster. Further, rather than generating a persona a representative user profile can be created with attributes with different ranges.

Figure 12:
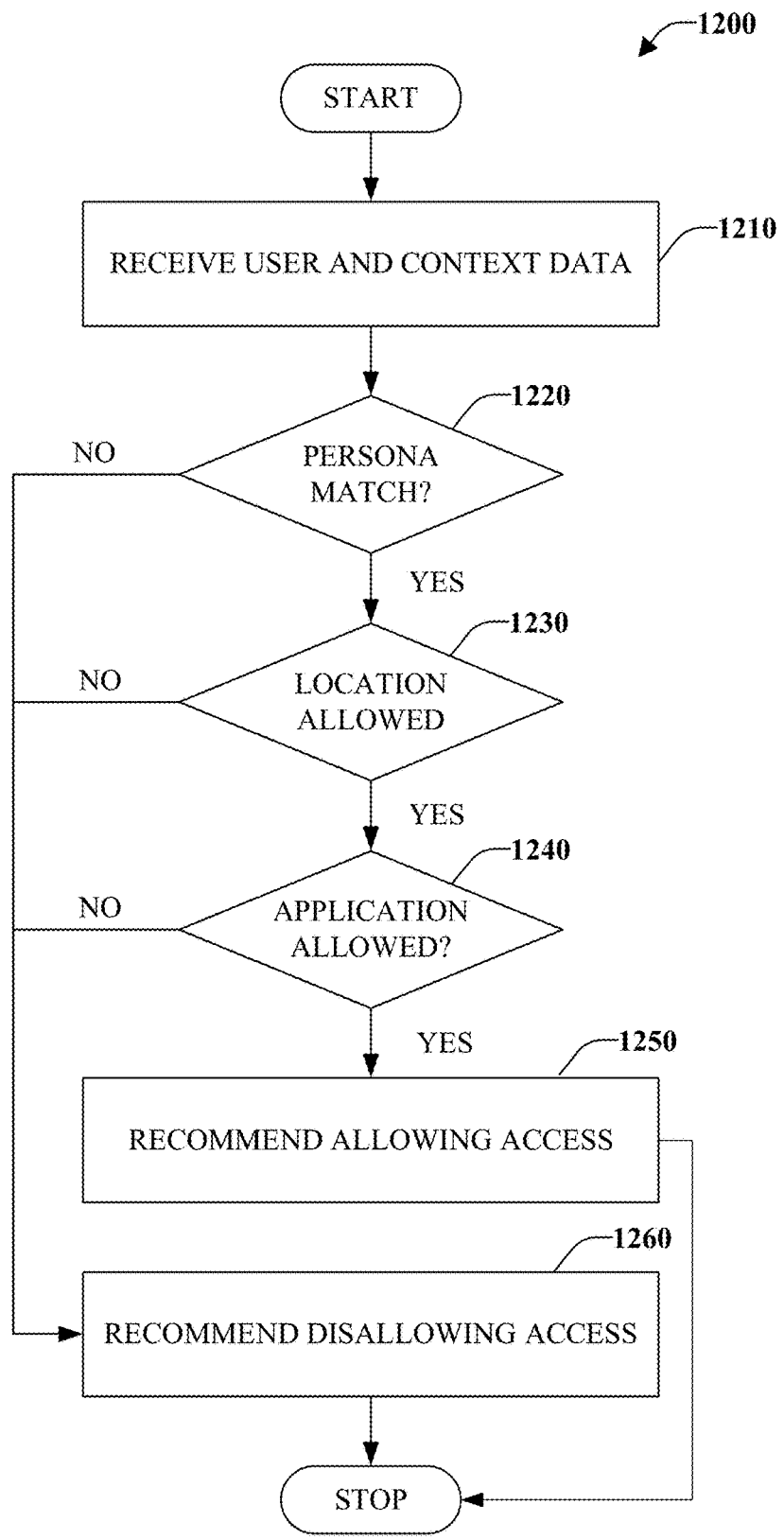
FIG. 12 is a flow chart diagram of a method of access recommendation.

FIG. 12 is a flow chart of a method of access recommendation 1200. The access recommendation system 102 and components thereof can perform the subject method of access recommendation. At reference numeral 1210, user attributes and context data can be received, for example in response to a request for access to data including sensitive or confidential data. The user attributes can include information regarding the user role, among other things. Further context can include location and computer system or environment on which the requested data resides.

At 1220, a determination is made as to whether there is a persona match. User attribute and context data can be utilized to determine a predetermined persona that most closely matches the user. In one instance, a supervised machine-learning approach can be utilized to classify a user into a predetermined persona. The requested data access and information surrounding the data access such as the processing system involved can be compared with the matching persona to determine whether such requested access is consistent with access associated with the matching persona. A predetermined consistency threshold and comparison thereto can be employed to determine whether access is consistent or not. If the access request is inconsistent with the persona a persona match has not occurred ("NO"). In this scenario, the method proceeds to numeral 1260 where a recommendation is made to disallow access based on the inconsistency. If the persona does match ("YES"), meaning the access request is consistent with a corresponding persona, the method proceeds to 1230.

At numeral 1230, a determination is made regarding whether geographic location is allowed. In some instances, a policy or regulation can set geographical limitations on data access. For example, access is allowed inside a country but not outside the country. Consequently, the determination concerns whether a user's current geographic location is allowed. If the location is not allowed ("NO"), such as when the user is outside a country, the method continues at 1260 where a recommendation of not permitting access is made. If the location is allowed ("YES"), the method proceeds to 1240.

A determination is made as to whether or not a particular application is allowed, at reference numeral 1240. In one instance, use of particular data can be confined to use by particular groups while excluding other groups. For example, use of the data by particular lines of business can be excluded. In one instance, a rule, regulation, or policy can indicate that access of particular data is excluded for use in marketing. Members of the marketing team of an organization will therefore not be permitted to access such data. Accordingly, membership of the user in certain groups can be determined and compared with those allowed. If the application is not allowed ("NO"), the method continues at 1260, where a recommendation disallowing access is made. If the application is allowed ("YES"), the method continues at 1250 where a recommendation is made to allow access.

Aspects of the subject disclosure concern the technical problems of data protection. The problems are solved with technical processes of scanning datasets of distinct computer environments of an organization to identify data elements subject to protection, such as sensitive data. A lineage for identified data elements can also be determined including relationships amongst data and linkages between computer environments or systems. Protection can then be applied to the identified data based at least in part on the lineage. Further, artificial intelligence techniques are employed to facilitate identification of sensitive data as well as generation and employment of user personas in conjunction with access recommendations.

The subject disclosure provides for various products and processes that are configured to identify and protect a subset of data, such as sensitive data, and various functionality related thereto. What follows are one or more exemplary systems and methods.

A system comprises a processor coupled to a memory that stores instructions that when executed by the processor cause the processor to: determine attributes associated with a user requesting access to data; matching the user to a persona of a set of personas based on the attributes, wherein the set of personas is generated based on historical data access patterns; determine a consistency level associated with an access request of the user and the persona; and generate an access recommendation of one of grant, deny or revoke based on comparison of the consistency level to a predetermined threshold. The instructions can further cause the processor to employ unsupervised learning to identify clusters of access data and generate a persona from each of the clusters. Supervised learning can also be employed by the processor to match a user to a persona. The instructions can further cause the processor to initiate transmission of the recommendation to an access control system or component operable to control whether or not access will be provided to a user. In one instance, the data to which access is requested is one of sensitive data or confidential data. The instructions can further cause the processor to determine an exception applies based on the attributes and requested data, and generate a recommendation to deny or revoke access. In one instance, the exception is geographic location and current location of the user is outside a predetermined geographic location. In another instance, the exceptions is a particular use or application, and the user is a member of a group that is excluded from use (e.g., marketing). The instructions further cause the processor to determine and recommend an access level based on the persona.

A method comprises executing, on a processor, instructions that cause the processor to perform operations comprising: determining attributes associated with a user requesting access to data; matching the user to a persona of a set of personas based on the attributes, wherein the set of personas is generated based on historical data access patterns; determining a consistency level associated with a access request of the user and the persona; and generating an access recommendation of one of grant, revoke or deny based on comparison of the consistency level to a predetermined threshold. The operations further comprise identifying clusters of access data with an unsupervised learning technique and generating a persona from each of the clusters. The operations further comprise employing supervised learning to match the user to a persona. The operation further comprise determining that an exception applies based on attributes and requested data, and generating an access recommendation denying access. The operations further comprise determining and recommending an access level based on the persona.

A method comprises executing, on a processor, instructions that cause the processor to perform operations comprising: identifying data elements subject to protection from datasets of different computing environments of an organization; determining an access pattern associated with each of the data elements, wherein the access pattern includes a user identifier, and access date and time; and protecting the data elements by way of one of a hash, encryption, or tokenization. The operations further comprise generating a report for at least a subset of the data elements including access history in terms of one or more access patterns. In one instance, identifying the data elements subject to protection further comprises classifying the data elements based on a supervised learning technique, and identifying the data elements comprises identifying the data elements from an image.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 13:
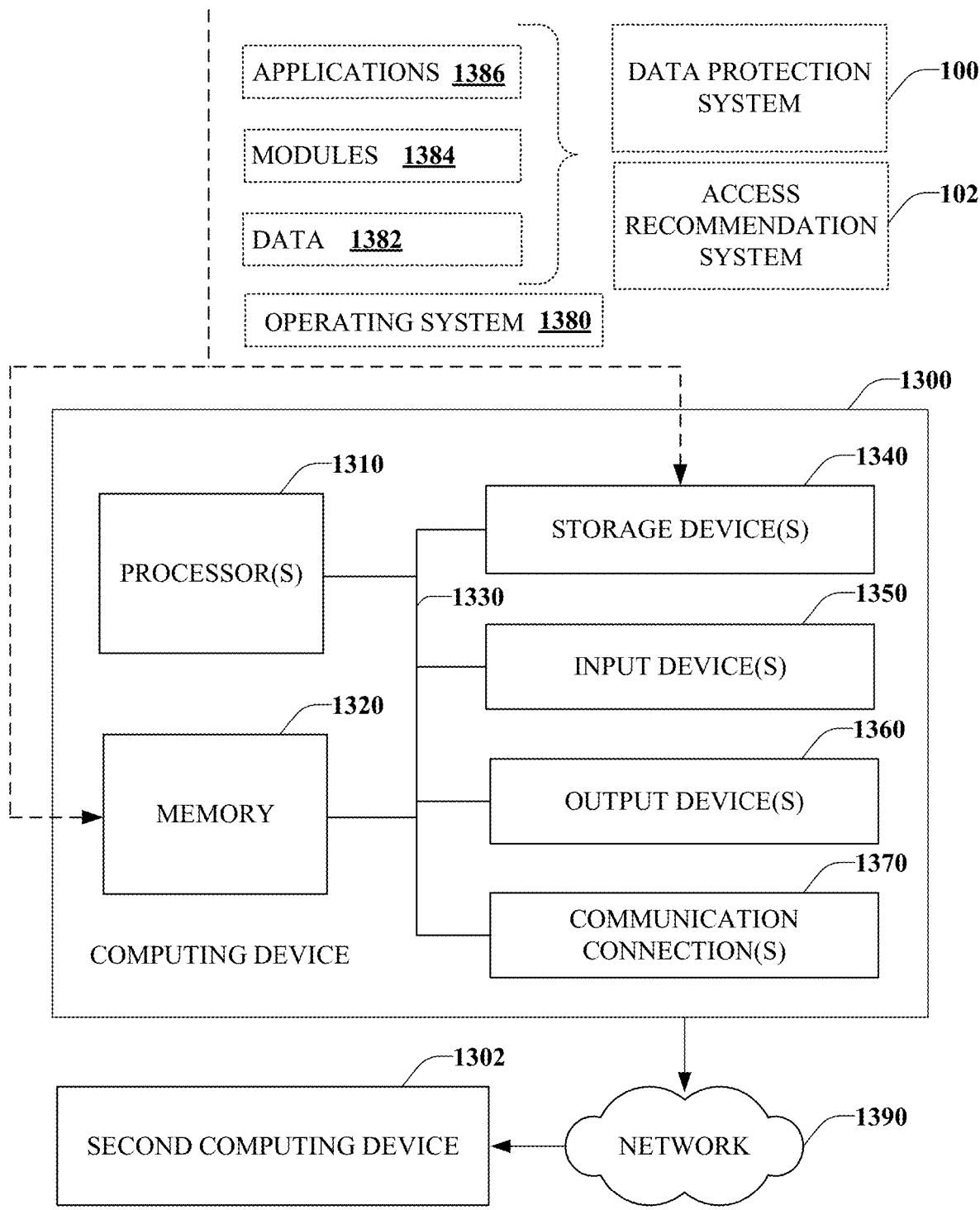
FIG. 13 is a schematic block diagram illustrating a suitable operating environment for aspects of the subject disclosure.

To provide a context for the disclosed subject matter, FIG. 13 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 13, illustrated is an example computing device 1300 (e.g., desktop, laptop, tablet, watch, server, hand-held, programmable consumer or industrial electronics, set-top box, game system, compute node . . . ). The computing device 1300 includes one or more processor (s) 1310, memory 1320, system bus 1330, storage device(s) 1340, input device(s) 1350, output device(s) 1360, and communications connection(s) 1370. The system bus 1330 communicatively couples at least the above system constituents. However, the computing device 1300, in its simplest form, can include one or more processors 1310 coupled to memory 1320, wherein the one or more processors 1310 execute various computer executable actions, instructions, and or components stored in the memory 1320.

The processor(s) 1310 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1310 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1310 can be a graphics processor unit (GPU) that performs calculations with respect to digital image processing and computer graphics.

The computing device 1300 can include or otherwise interact with a variety of computer-readable media to facilitate control of the computing device to implement one or more aspects of the disclosed subject matter. The computer-readable media can be any available media that is accessible to the computing device 1300 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1300. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1320 and storage device(s) 1340 are examples of computer-readable storage media. Depending on the configuration and type of computing device, the memory 1320 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1300, such as during start-up, can be stored in nonvolatile memory, while volatile memory can act as external cache memory to facilitate processing by the processor(s) 1310, among other things.

The storage device(s) 1340 include removable/non-removable, volatile/non-volatile storage media for storage of vast amounts of data relative to the memory 1320. For example, storage device(s) 1340 include, but are not limited to, one or more devices such as a magnetic or optical disk drive, floppy disk drive, flash memory, solid-state drive, or memory stick.

Memory 1320 and storage device(s) 1340 can include, or have stored therein, operating system 1380, one or more applications 1386, one or more program modules 1384, and data 1382. The operating system 1380 acts to control and allocate resources of the computing device 1300. Applications 1386 include one or both of system and application software and can exploit management of resources by the operating system 1380 through program modules 1384 and data 1382 stored in the memory 1320 and/or storage device (s) 1340 to perform one or more actions. Accordingly, applications 1386 can turn a general-purpose computer 1300 into a specialized machine in accordance with the logic provided thereby.

All or portions of the disclosed subject matter can be implemented using standard programming and/or engineering techniques to produce software, firmware, hardware, or any combination thereof to control the computing device 1300 to realize the disclosed functionality. By way of example and not limitation, all or portions of the data protection system 100 and the access recommendation system 102 can be, or form part of, the application 1386, and include one or more modules 1384 and data 1382 stored in memory and/or storage device(s) 1340 whose functionality can be realized when executed by one or more processor(s) 1310.

In accordance with one particular embodiment, the processor(s) 1310 can correspond to a system on a chip (SOC) or like architecture including, or in other words integrating, both hardware and software on a single integrated circuit substrate. Here, the processor(s) 1310 can include one or more processors as well as memory at least similar to the processor(s) 1310 and memory 1320, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the data protection system 100 and access recommendation system 102 and/or functionality associated therewith can be embedded within hardware in a SOC architecture.

The input device(s) 1350 and output device(s) 1360 can be communicatively coupled to the computing device 1300. By way of example, the input device(s) 1350 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1360, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1350 and output device(s) 1360 can be connected to the computing device 1300 by way of wired connection (e.g., bus), wireless connection (e.g., Wi-Fi, Bluetooth . . . ), or a combination thereof.

The computing device 1300 can also include communication connection(s) 1370 to enable communication with at least a second computing device 1302 by means of a network 1390. The communication connection(s) 1370 can include wired or wireless communication mechanisms to support network communication. The network 1390 can correspond to a local area network (LAN) or a wide area network (WAN) such as the Internet. The second computing device 1302 can be another processor-based device with which the computing device 1300 can interact. For example, the computing device 1300 can form part of a network service platform that exposes the data protection system 100 and access recommendation system 102 as a service to the second computing device 1302. In one implementation, the computing device 1300 can execute functionality associated with data protection including discovery of data subject to protection and the second computing device 1302 can store data associated with a particular line of business. In another implementation, the second computing device 1302 can request and receive a report with respect to compliance with rules, polices, or regulation from the computing device 1300 executing audit functionality.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer implemented method comprising:
    identifying data elements subject to protection, the data elements being identified from datasets of different computing environments of an organization;
    determining an access pattern associated with each of the data elements, wherein the access pattern includes a user identifier, and access date and time;
    determining a lineage of a subset of the data elements, the lineage being determined based on movement of the subset of the data elements from a source system of the subset of the data elements to a target system of the subset of the data elements;
    based on the lineage determined based on the movement of the subset of the data elements from the source system to the target system, identifying a level of sensitivity for the subset of the data elements, the level of sensitivity indicating a first protection level associated with the target system and a second protection level associated with the source system;
    responsive to identifying the level of sensitivity for the subset of the data elements, determining a protection type for the first protection level for the subset of the data elements, the determined protection type for the first protection level including one or more of a hash, encryption, or tokenization; and
    protecting the subset of the data elements by applying the determined protection type for the first protection level.

2. The computer implemented method of claim 1, further comprising generating a report for at least the subset of the data elements including access history in terms of one or more access patterns.

3. The computer implemented method of claim 1, wherein identifying the data elements subject to protection further comprises classifying the data elements based on a supervised learning technique.

4. The computer implemented method of claim 3, wherein identifying the data elements comprises identifying the data elements from an image.

5. The computer implemented method of claim 1, further comprising employing unsupervised learning to determine one or more access patterns associated with each of the data elements.

6. The computer implemented method of claim 5, further comprising determining a persona from each of the access patterns.

7. The computer implemented method of claim 1, wherein protecting the subset of the data elements by applying the determined protection type for the first protection level is implemented prior to the movement of the subset of the data elements from the source system to the target system.

8. A system comprising:
    a processor configured to:
    identify data elements subject to protection, the data elements being identified from datasets of different computing environments of an organization;
    determine an access pattern associated with each of the data elements, wherein the access pattern includes a user identifier, and access date and time;
    determine a lineage of a subset of the data elements, the lineage being determined based on movement of the subset of the data elements from a source system of the subset of the data elements to a target system of the subset of the data elements;
    based on the lineage determined based on the movement of the subset of the data elements from the source system to the target system, identify a level of sensitivity for the subset of the data elements, the level of sensitivity indicating a first protection level associated with the target system and a second protection level associated with the source system;
    responsive to identifying the level of sensitivity for the subset of the data elements, determine a protection type for the first protection level for the subset of the data elements, the determined protection type for the first protection level including one or more of a hash, encryption, or tokenization; and
    protect the subset of the data elements by applying the determined protection type for the first protection level.

9. The system of claim 8, wherein the processor is further configured to generate a report for at least the subset of the data elements including access history in terms of one or more access patterns.

10. The system of claim 8, wherein identifying the data elements subject to protection further comprises classifying the data elements based on a supervised learning technique.

11. The system of claim 10, wherein identifying the data elements comprises identifying the data elements from an image.

12. The system of claim 8, wherein the processor is further configured to employ unsupervised learning to determine one or more access patterns associated with each of the data elements.

13. The system of claim 12, wherein the processor is further configured to determine a persona from each of the access patterns.

14. The system of claim 8, wherein protecting the subset of the data elements by applying the determined protection type for the first protection level is implemented prior to the movement of the subset of the data elements from the source system to the target system.

15. A non-transitory computer readable medium comprising program code that when executed by one or more processors is configured to cause the one or more processors to:

identify data elements subject to protection, the data elements being identified from datasets of different computing environments of an organization;

determine an access pattern associated with each of the data elements, wherein the access pattern includes a user identifier, and access date and time;

determine a lineage of a subset of the data elements, the lineage being determined based on movement of the subset of the data elements from a source system of the subset of the data elements to a target system of the subset of the data elements;

based on the lineage determined based on the movement of the subset of the data elements from the source system to the target system, identify a level of sensitivity for the subset of the data elements, the level of sensitivity indicating a first protection level associated with the target system and a second protection level associated with the source system;

responsive to identifying the level of sensitivity for the subset of the data elements, determine a protection type for the first protection level for the subset of the data elements, the determined protection type for the first protection level including one or more of a hash, encryption, or tokenization; and protect the subset of the data elements by applying the determined protection type for the first protection level.

16. The non-transitory computer readable medium of claim 15, further comprising program code that when executed by the one or more processors causes the one or more processors to generate a report for at least the subset of the data elements including access history in terms of one or more access patterns.

17. The non-transitory computer readable medium of claim 15, wherein identifying the data elements subject to protection further comprises classifying the data elements based on a supervised learning technique.

18. The non-transitory computer readable medium of claim 17, wherein identifying the data elements comprises identifying the data elements from an image.

19. The non-transitory computer readable medium of claim 15, further comprising program code that when executed by the one or more processors causes the one or more processors to employ unsupervised learning to determine one or more access patterns associated with each of the data elements.

20. The non-transitory computer readable medium of claim 19, further comprising program code that when executed by the one or more processors causes the one or more processors to determine a persona from each of the access patterns.

* * * * *